(12) United States Patent
Farley

(10) Patent No.: US 10,182,555 B2
(45) Date of Patent: Jan. 22, 2019

(54) ANIMAL TREADWHEEL ASSEMBLY

(71) Applicant: Sean Farley, Camarillo, CA (US)

(72) Inventor: Sean Farley, Camarillo, CA (US)

( * ) Notice: Subject to any disclaimer, the term of this patent is extended or adjusted under 35 U.S.C. 154(b) by 390 days.

(21) Appl. No.: 14/697,877

(22) Filed: Apr. 28, 2015

(65) Prior Publication Data

US 2016/0007569 A1 Jan. 14, 2016

Related U.S. Application Data

(60) Provisional application No. 62/023,806, filed on Jul. 11, 2014.

(51) Int. Cl.
*A01K 15/02* (2006.01)
*A01K 29/00* (2006.01)

(52) U.S. Cl.
CPC ............ *A01K 15/027* (2013.01); *A01K 15/02* (2013.01); *A01K 29/00* (2013.01)

(58) Field of Classification Search
USPC ....... 119/700, 702, 703, 704, 712; D30/160; 472/16, 26, 44; 482/54, 78; 273/143 R, 273/142 R; 446/124, 236
See application file for complete search history.

(56) References Cited

U.S. PATENT DOCUMENTS

| | | | | |
|---|---|---|---|---|
| 724,672 A * | 4/1903 | Culver | ................... | A63G 27/00 104/77 |
| 883,485 A * | 3/1908 | Ridgway | ................ | A63G 31/14 119/700 |
| 916,009 A * | 3/1909 | Plummer | | |
| 1,264,738 A * | 4/1918 | Woolard | ................... | A63G 7/00 104/53 |
| 1,467,852 A * | 9/1923 | Hall | ........................ | B60B 25/02 301/32 |
| 1,521,133 A * | 12/1924 | Tinker | ................... | A47C 3/029 280/206 |
| 1,733,972 A * | 10/1929 | Miller | .................... | B60B 25/02 301/32 |
| 2,001,205 A * | 5/1935 | Marten | .................. | A63B 19/02 280/206 |
| 2,681,638 A * | 6/1954 | Carvell | ................ | A01K 15/027 119/452 |
| 3,464,718 A * | 9/1969 | Fisher | .................... | A63B 19/02 280/206 |

(Continued)

*Primary Examiner* — Andrea M Valenti
(74) *Attorney, Agent, or Firm* — Hackler Daghighian Martino & Novak

(57) ABSTRACT

A self-supporting rigid cylindrical treadwheel includes a plurality of identically-shaped platforms each having a curved surface. A first end of one platform is configured to be connectable to a second end of an adjacent platform in a repeatable manner where the plurality of platforms are configured to form a singular and continuous cylindrical structure. The treadwheel includes a plurality of identically-shaped elongated curved connectors. A connector extension of one connector is configured to be connectable to a connector recess of an adjacent connector in a repeatable manner where the plurality of connectors are configured to form a first and second singular and continuous ring. The first ring is configured to be attached to a right side of the cylindrical structure and the second ring is configured to be attached to a left side of the cylindrical structure.

21 Claims, 12 Drawing Sheets

(56) References Cited

U.S. PATENT DOCUMENTS

| | | | | |
|---|---|---|---|---|
| 3,536,324 | A * | 10/1970 | Ahrens | A63B 19/04 104/77 |
| 3,537,726 | A * | 11/1970 | Conover | A63B 19/02 280/206 |
| 3,934,291 | A * | 1/1976 | Hagen | B63B 1/047 440/100 |
| 4,389,047 | A * | 6/1983 | Hall | A63B 19/04 482/2 |
| 4,938,540 | A * | 7/1990 | Sacks | B60B 21/02 301/30 |
| 5,125,361 | A * | 6/1992 | Rowlands | A01K 15/027 119/700 |
| 6,074,305 | A * | 6/2000 | Schnapp | A63B 19/02 280/206 |
| 6,500,097 | B1 * | 12/2002 | Hall | A63B 19/04 482/51 |
| D484,284 | S * | 12/2003 | Venson | D30/160 |
| 7,288,849 | B1 * | 10/2007 | Chiang | F03G 5/025 290/1 R |
| D689,154 | S * | 9/2013 | Seo | D21/669 |
| 9,314,682 | B2 * | 4/2016 | Baek | A63B 69/0035 |
| 2011/0124468 | A1 * | 5/2011 | Incerti Fornaciari | A63B 19/04 482/8 |
| 2011/0214614 | A1 * | 9/2011 | Sharp | A01K 1/011 119/166 |
| 2014/0145497 | A1 * | 5/2014 | Chang | B60B 21/00 301/95.102 |

\* cited by examiner

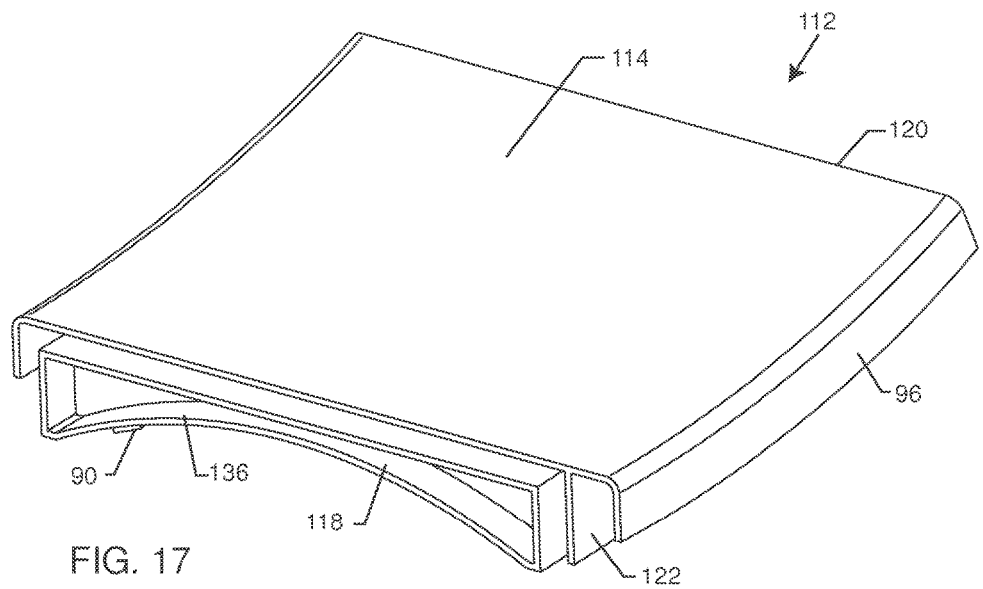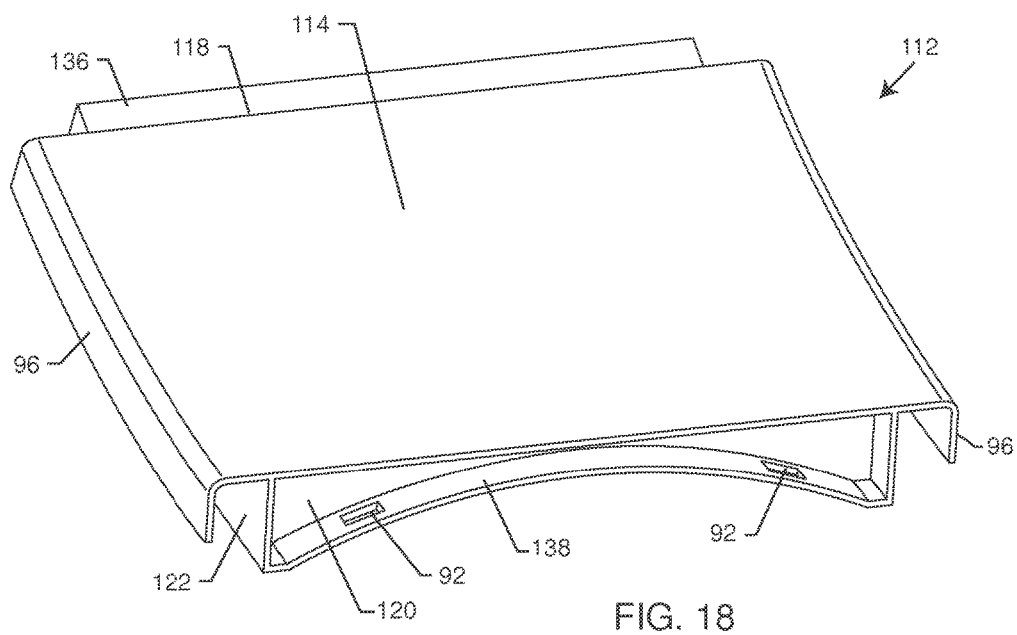

US 10,182,555 B2

ANIMAL TREADWHEEL ASSEMBLY

CROSS-REFERENCE TO RELATED APPLICATIONS

This non-provisional application claims priority to provisional application No. 62/023,806 filed on Jul. 11, 2014 the entire contents of which are hereby incorporated by reference.

DESCRIPTION

Field of the Invention

The present invention generally relates to treadwheels wheels. More particularly, the present invention relates to a treadwheel for an animal that can be assembled with a plurality of just two different parts and without the need for tools.

Background of the Invention

Animal treadwheels for medium-sized pets such as dogs and cats have been taught in the prior art. However, these treadwheels are usually hard to assemble or manufacture. Furthermore, these treadwheels can be very large in size such that the shipping methods and costs are unduly burdensome and expensive for the end user or purchaser.

Accordingly, a need exists for a treadwheel that can be assembled by the end user in an easy manner which doesn't require tools. Also, a need exists for the treadwheel to ship in a more compact manner. Therefore, the cost and expense of manufacturing and shipping the treadwheel can be reduced such that more people are able to purchase and use the treadwheel.

SUMMARY OF THE INVENTION

An embodiment of an animal treadwheel assembly includes a plurality of platforms. Each platform includes: a curved surface opposite a bottom side; a first end opposite a second end; a left side opposite a right side; wherein the first and second ends are connected by the left and right sides; wherein the curved surface is delimited by the first end, left side, second end, and right side; an upper right side edge formed along the right side concentric to the curved surface; a lower right side edge formed along the right side concentric to the upper right side edge; an upper left side edge formed along the left side concentric to the curved surface; a lower left side edge formed along the left side concentric to the upper left side edge. The treadwheel assembly also includes a plurality of elongated curved connectors. Each connector includes: an outside end opposite an inside end; a curved upper surface opposite a curved bottom surface; a first connector end opposite a second connector end; wherein the outside end is contiguous to the curved upper surface; wherein the curved upper surface is contiguous with the inside end; wherein the inside end is contiguous with the curved bottom surface; wherein the curved bottom surface is contiguous with the outside end; wherein the first connector end and second connector end are delimited by the outside end, curved upper surface, inside end and curved bottom surface; a first catch formed at the inside end near the curved upper surface; a second catch formed at the inside end near the curved bottom surface; a connector extension formed at the first connector end; a connector recess formed at the second connector end. The first end of one platform is configured to be connectable to the second end of an adjacent platform in a repeatable manner where the plurality of platforms are configured to form a singular and continuous cylindrical surface from the plurality of curved surfaces. The connector extension of one connector is configured to be connectable to the connector recess of an adjacent connector in a repeatable manner where the plurality of connectors are configured to form two singular and continuous rings. Each singular and continuous ring is attachable to the cylindrical and continuous cylindrical surface forming a self-supporting rigid cylindrical treadwheel, where the plurality of first catches connect to the plurality of upper side edges and where the plurality of second catches connect to the plurality of lower side edges. A stationary base is configured to rest upon a surface, the stationary base supporting a plurality of rollers, where the plurality of rollers are configured to roll against the plurality of curved bottom surfaces allowing the self-supporting rigid cylindrical treadwheel to spin freely when an animal moves upon the singular and continuous cylindrical surface.

In other embodiments, a lip edge may project from and along the entirety of the curved bottom surface.

The treadwheel may include a plurality of pads, each pad configured to attach to the entirety of the curved surface.

The curved surface may be concave in shape.

The self-supporting rigid cylindrical treadwheel may be void of auxiliary fasteners.

The platform may consist of a single part of plastic injection molded plastic. The connector may consists of a single part of plastic injection molded plastic.

A platform extension may be formed at the first end, and a platform recess formed at the second end, wherein the platform extension of the one platform is configured to be connectable to the platform recess of the adjacent platform in a repeatable manner for the plurality platforms. The platform extension may be configured to assemble into the platform recess in a movement direction that is generally perpendicular to adjacent first and second ends. The connector extension may be configured to assemble into the connector recess in a movement direction that is generally perpendicular to the outside and inside ends.

Each singular and continuous ring may be configured to assemble to the plurality of platforms in a movement direction that is perpendicular to the left side and right side of the platforms.

The self-supporting rigid cylindrical treadwheel may be formed where the abutting ends of the plurality of platforms are staggered in relation to the abutting ends of the plurality of elongated curved connectors.

The plurality of platforms may comprise at least eight platforms. The plurality of elongated curved connectors may comprise at least sixteen connectors.

An embodiment of an animal treadwheel assembly includes a plurality of identically-shaped platforms. Each platform comprises a curved surface delimited by a first end, left side, second end and right side, where the left side is opposite the right side and the first end is opposite the second end. The treadwheel includes a plurality of identically-shaped elongated curved connectors. Each connector comprises: a first connector end opposite a second connector end; where the connector ends are delimited by a curved upper surface, an outside end, a curved bottom surface and an inside end, where the outside end is opposite the inside end and where the curved upper surface is opposite the curved bottom surface; a connector extension formed at the first connector end; and a connector recess formed at the second connector end. The first end of one platform is configured to be connectable to a second end of an adjacent platform in a repeatable manner where the plurality of platforms are configured to form a singular and continuous cylindrical structure. The connector extension of one connector is configured to be connectable to a connector recess of an adjacent connector in a repeatable manner where the plurality of connectors are configured to form a first singular and continuous ring and a second singular and continuous ring. The first ring is configured to be attached to the right side of the cylindrical structure and the second ring is configured to be attached to the left side of the cylindrical structure forming a self-supporting rigid cylindrical treadwheel. A stationary base configured to rest upon a surface, the stationary base supporting a plurality of rollers, where the plurality of rollers are configured to roll against the plurality of curved bottom surfaces allowing the self-supporting rigid cylindrical treadwheel to spin freely when an animal moves within the treadwheel.

An embodiment of a self-supporting rigid cylindrical treadwheel consists of a plurality of identically-shaped platforms each having a curved surface, wherein a first end of one platform is configured to be connectable to a second end of an adjacent platform in a repeatable manner where the plurality of platforms are configured to form a singular and continuous cylindrical structure. The treadwheel also consists of a plurality of identically-shaped elongated curved connectors, wherein a connector extension of one connector is configured to be connectable to a connector recess of an adjacent connector in a repeatable manner where the plurality of connectors are configured to form a first singular and continuous ring and a second singular and continuous ring. The first ring is configured to be attached to a right side of the cylindrical structure and the second ring is configured to be attached to a left side of the cylindrical structure.

An embodiment of an animal treadwheel assembly comprises a self-supporting rigid cylindrical treadwheel consisting of a plurality of identically-shaped platforms each having a curved surface, wherein a first end of one platform is configured to be connectable to a second end of an adjacent platform in a repeatable manner where the plurality of platforms are configured to form a singular and continuous cylindrical structure forming the self-supporting rigid cylindrical treadwheel. A stationary base is configured to rest upon a surface, the stationary base supporting a plurality of rollers above the surface, where the plurality of rollers are configured to rotatably support the treadwheel to spin freely when an animal moves within the self-supporting rigid cylindrical treadwheel.

BRIEF DESCRIPTION OF THE DRAWINGS

The accompanying drawings illustrate the invention. In such drawings:

FIG. 17 is a top perspective view of the platform of FIG. 15; and

FIG. 18 is another top perspective view of the platform of FIG. 15.

DETAILED DESCRIPTION OF THE PREFERRED EMBODIMENTS

Figure 2:
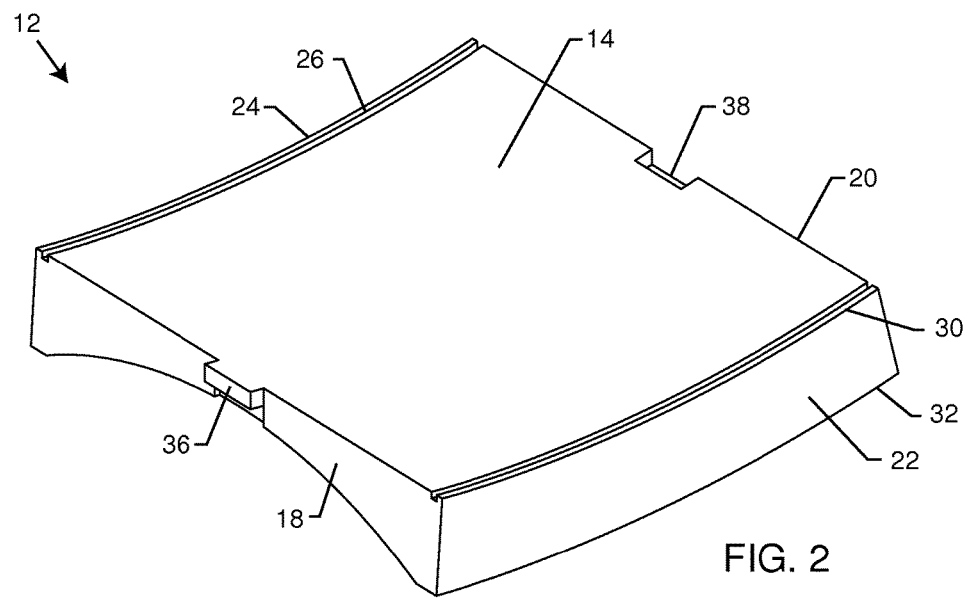
FIG. 2 is a top perspective view of an exemplary platform from the animal treadwheel assembly of FIG. 1.
Figure 3:
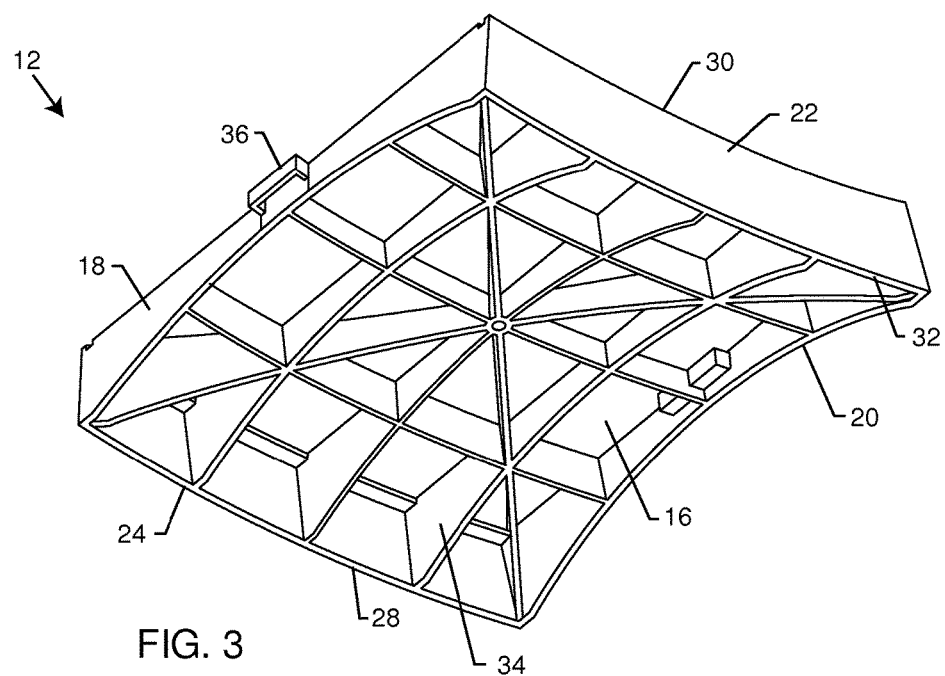
FIG. 3 is a bottom perspective view of the platform of FIG. 2.

An animal treadwheel assembly 10 includes a plurality of platforms 12. The platforms 12 are best seen in FIGS. 2 and 3. Each platform 12 has a curved surface 14 opposite a bottom side 16, a first end 18 opposite a second end 20, and a left side 22 opposite a right side 24. The first end 18 and second end 20 are connected by the left side 22 and right side 24. The curved surface 14 is delimited by the first end 18, left side 22, second end 20, and right side 24. (Delimited means that it determines the limits or boundaries thereof.) An upper right side edge 26 is formed along the right side 24 concentric to the curved surface 14. (Concentric means of or denoting circles, arcs, or other shapes that share the same center, the larger often completely surrounding the smaller.) A lower right side edge 28 is formed along the right side 24 concentric to the upper right side edge 26 or the curved surface 14. An upper left side edge 30 is formed along the left side 22 concentric to the curved surface 14. A lower left side edge 32 is formed along the left side concentric to the upper left side edge 30 or the curved surface 14.

As can be seen in the figures, the curved surface 14 is concentric in shape, such that when each individual platform 12 forms a part of the inside of the treadwheel structure 40. The curved surface 14 is also a substantially continuous surface which is free of major apertures or holes. This aids in the animal being able to traverse upon any portion of the curved surface 14. Opposite the curved surface 14 is the bottom side 16. The bottom side 16 has a plurality of strengthening ribs 34 formed therein. The strengthening ribs 34 provide substantial inherent stiffness and rigidity for the final assembly of the treadwheel structure 40.

As shown in FIGS. 2 and 3, each platform may have a platform extension 36 formed at the first end 18, and a platform recess 38 formed at the second end 20. The platform extension 36 of the one platform is configured to be connectable to the platform recess 38 of the adjacent platform in a repeatable manner for the plurality platforms 12. The platform extension 36 nesting and connecting within the platform recess 38 helps to align each platform 12 relative to an adjacent platform 12 when forming the treadwheel structure 40. The platform extension 36 can be a variety of connecting shapes that are received by the inverse shape of the platform recess 38. As shown herein, the platform extension 36 is configured to assemble into the platform recess 38 in a movement direction that is generally perpendicular to adjacent first 18 and second ends 20.

One skilled in the art will also understand that the platform 12 can be made as an injection molded part. The platform 12 can be constructed as shown such that it can be made in a simple two part mold where two halves of a mold can be pulled apart to expose and retrieve the platform 12. In other words, the entirety of each platform 12 may consists of a single part of plastic injection molded plastic. In another embodiment not shown, the platform 12 could be made as a vacuum formed part or from a sheet of plastic that is flex bent into outer rims. As can be appreciated, many manufacturing methods may be used to make the platform 12 or equivalent structures.

Figure 4:
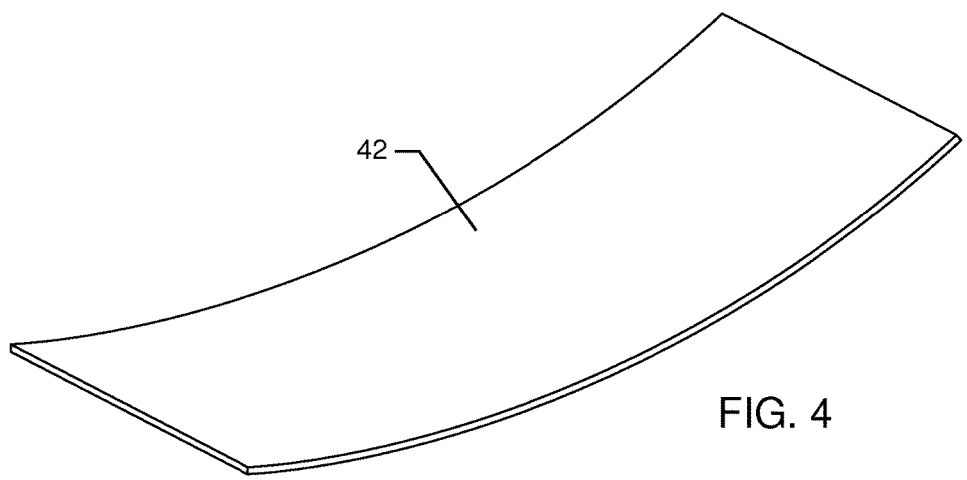
FIG. 4 is a top perspective view of an exemplary pad from the animal treadwheel assembly of FIG. 1.
Figure 5:
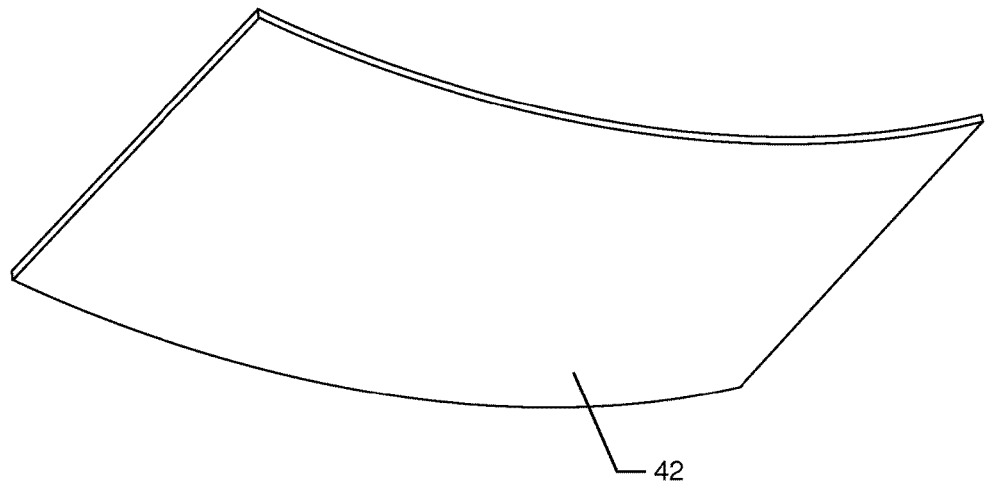
FIG. 5 is a bottom perspective view of the pad of FIG. 4.
Figure 6:
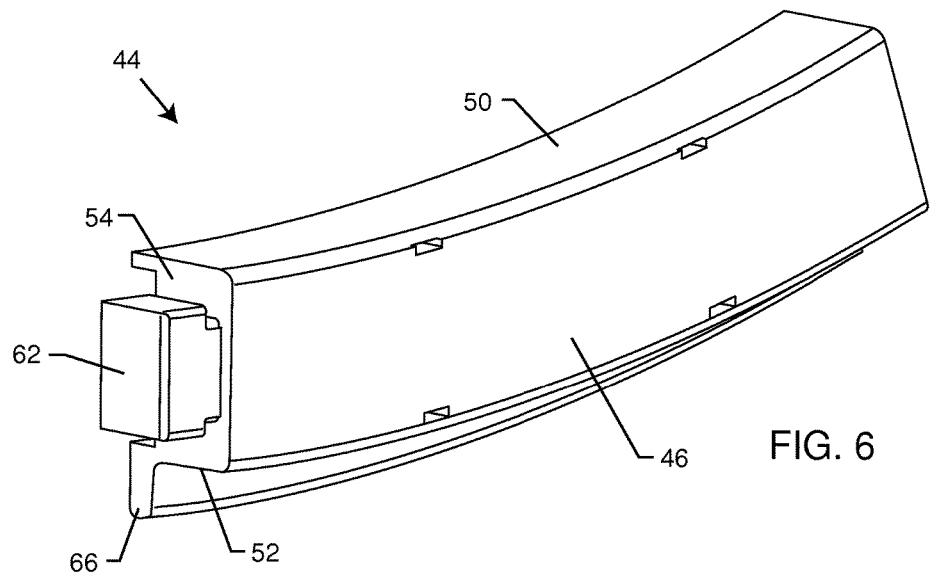
FIG. 6 is an outside perspective view of an exemplary connector from the animal treadwheel assembly of FIG. 1.
Figure 7:
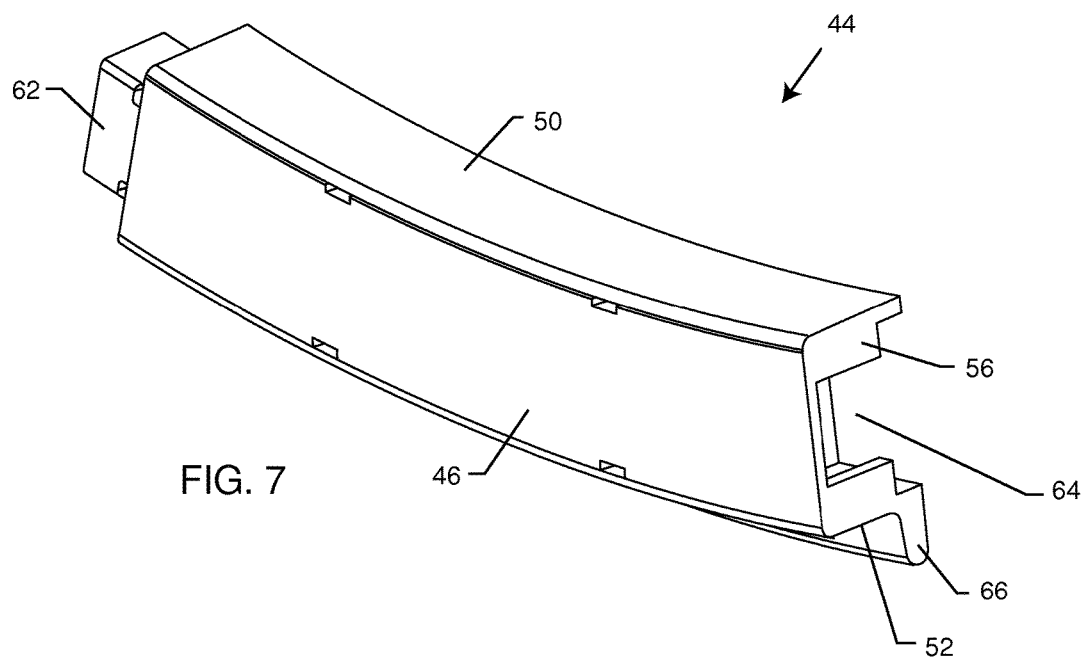
FIG. 7 is another outside perspective view of the connector of FIG. 6.
Figure 8:
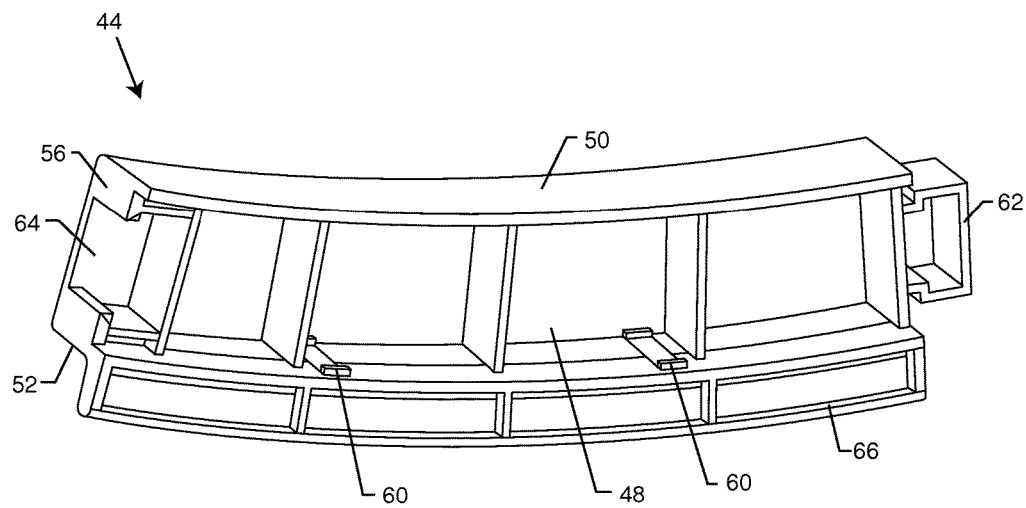
FIG. 8 is an inside perspective view of the connector of FIG. 6.
Figure 9:
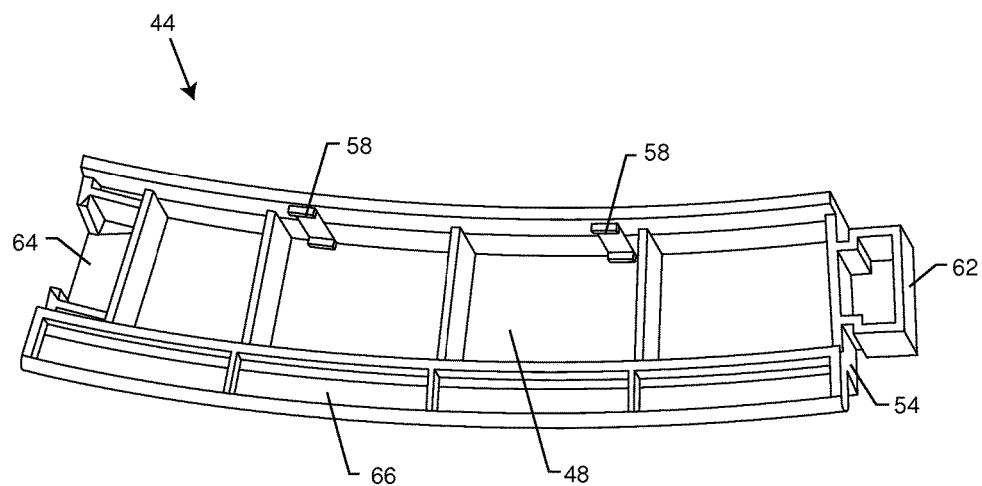
FIG. 9 is another inside perspective view of the connector of FIG. 6.
Figure 10:
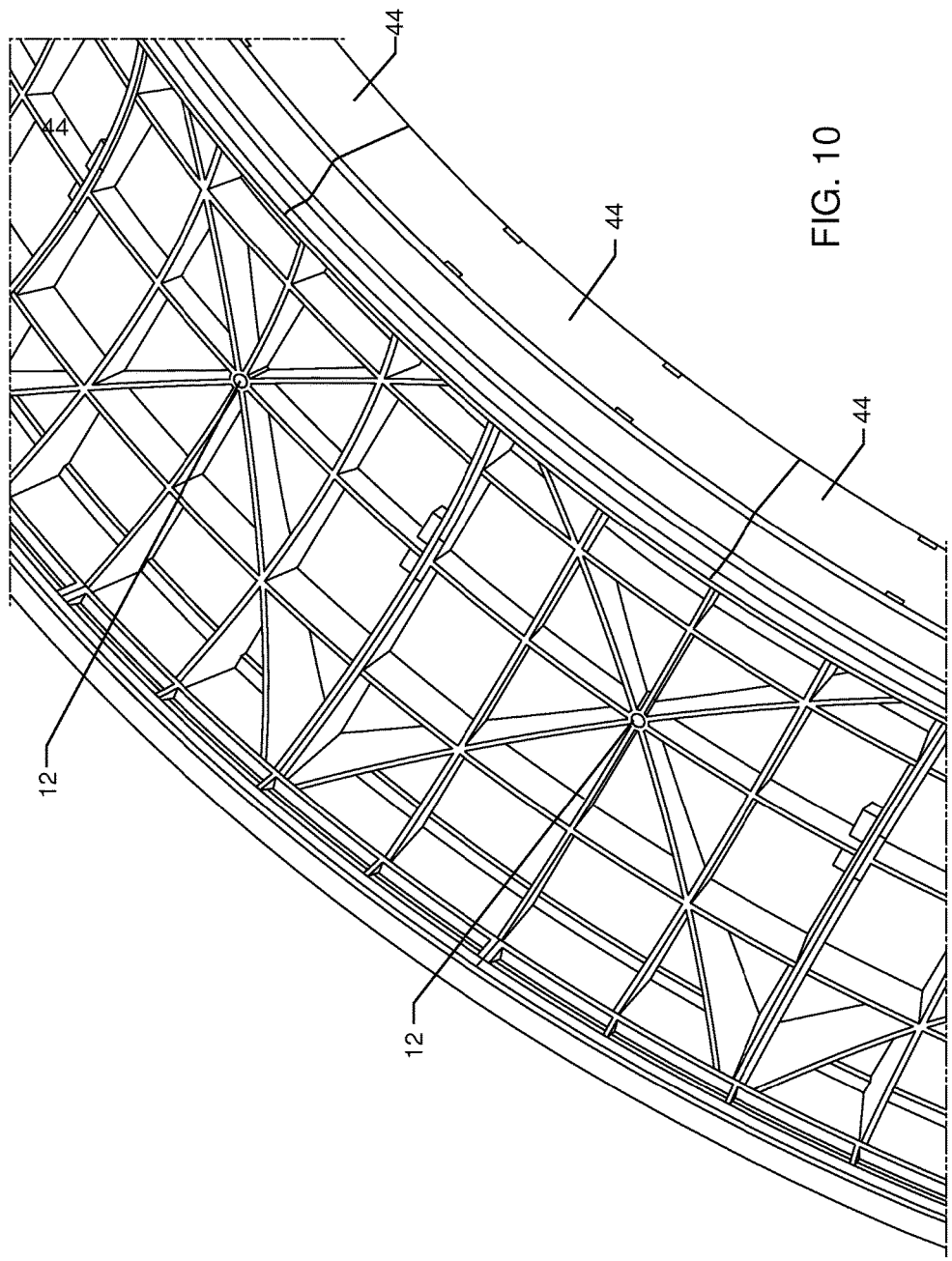
FIG. 10 is an enlarged perspective view of the animal treadwheel of FIG. 1.

FIGS. 4 and 5 show a pad 42 that could be placed upon the curved surface 14 of the platform 12. The pad 42 may have a bottom adhesive surface that bonds to the curved surface 14. The pads 42 may also be resilient in form such that the pad 42 provides some added level of shock absorption and cushion for the animal walking upon the pad 42. The pad 42 may also incorporate a traction-enhanced surface to increase the animals grip when walking thereon. The pad 14 may be made from a resilient foam or rubber compound or the like.

FIGS. 6-9 show an elongated curved connector 44. Each connector 44 includes an outside end 46 opposite an inside end 48, a curved upper surface 50 opposite a curved bottom surface 52, and a first connector end 54 opposite a second connector end 56. As shown herein, the outside end 46 is contiguous to the curved upper surface 50, the curved upper surface 50 is contiguous with the inside end 48, the inside end 48 is contiguous with the curved bottom surface 52, and the curved bottom surface 52 is contiguous with the outside end 46. (Contiguous means sharing a common border; i.e. touching) The first connector end 54 and second connector end 56 are delimited by the outside end 46, curved upper surface 50, inside end 48 and curved bottom surface 52.

A first catch 58 (also appropriately named as a grip, nub, or latch) is formed at the inside end 48 near the curved upper surface 50. A second catch 60 formed at the inside end near 48 the curved bottom surface 52. The catch 58/60 may be one catch or a plurality of catches.

A connector extension 62 is formed at the first connector end 54 and a connector recess 64 is formed at the second connector end 56. The connector extension 62 is match formed with the connector recess 64 such that one securely fits and nests within the other. In this way a plurality of connectors 44 can attach to one another. In these embodiments the connector extension 62 is configured to assemble into the connector recess 64 in a movement direction that is generally perpendicular to the outside end 46 and inside end 48.

The connector 44 also may include a lip 66 edge projecting from and along the entirety of the curved bottom surface 52. The lip 66 is used to help keep the treadwheel structure 40 aligned onto various rollers when in use.

One skilled in the art will also understand that the connector 44 may be made of a single part of plastic injection molded plastic. Furthermore, the connector 44 may be made from a simple two part mold where two halves of a mold can be pulled apart to expose and retrieve the connector 44. In other words, the entirety of each connector 44 may consist of a single part of a plastic injection molded plastic.

The treadwheel structure 40 is comprised of a plurality of platforms 12 connected to one another wherein the first end 18 of one platform 12 is configured to be connectable to the second end 20 of an adjacent platform 12 in a repeatable manner where the plurality of platforms 12 are configured to form a singular and continuous cylindrical surface from the plurality of curved surfaces 14.

Then, the plurality of connectors 44 are connected to one another, wherein the connector extension 62 of one connector 44 is configured to be connectable to the connector recess 64 of an adjacent connector 12 in a repeatable manner where the plurality of connectors 44 are configured to form two singular and continuous rings.

Then each singular and continuous ring of connectors 44 is attachable to the cylindrical and continuous cylindrical surface forming a self-supporting rigid cylindrical treadwheel 40. Each plurality of connectors 44 from the singular and continuous rings are configured to assemble to the plurality of platforms 12 in a movement direction that is perpendicular to the left side 22 and right side 24 of the platforms 12. More specifically, the first catch 58 of each connector 44 secures to the upper right side edge 26 or upper left side edge 30 of the platforms 12. Then the second catch 60 secures to the lower right side edge 28 or lower left side edge 32 of the platforms 12.

The treadwheel structure 40 is essentially formed from just two different parts, the platform 12 and the connector 44. The plurality of platforms 12 may comprise at least four or eight platforms 12 and the plurality of elongated curved connectors 44 may comprise at least eight or sixteen connectors. In this manner, the treadwheel assembly 40 is a self-supporting rigid cylindrical treadwheel 40 that is void of auxiliary fasteners, meaning it can be assembled by hand without the need of auxiliary tools or other fasteners. As can be seen, the number of platforms 12 and connectors 44 may vary more or less than as taught and still be consistent with the structure taught herein.

Figure 12:
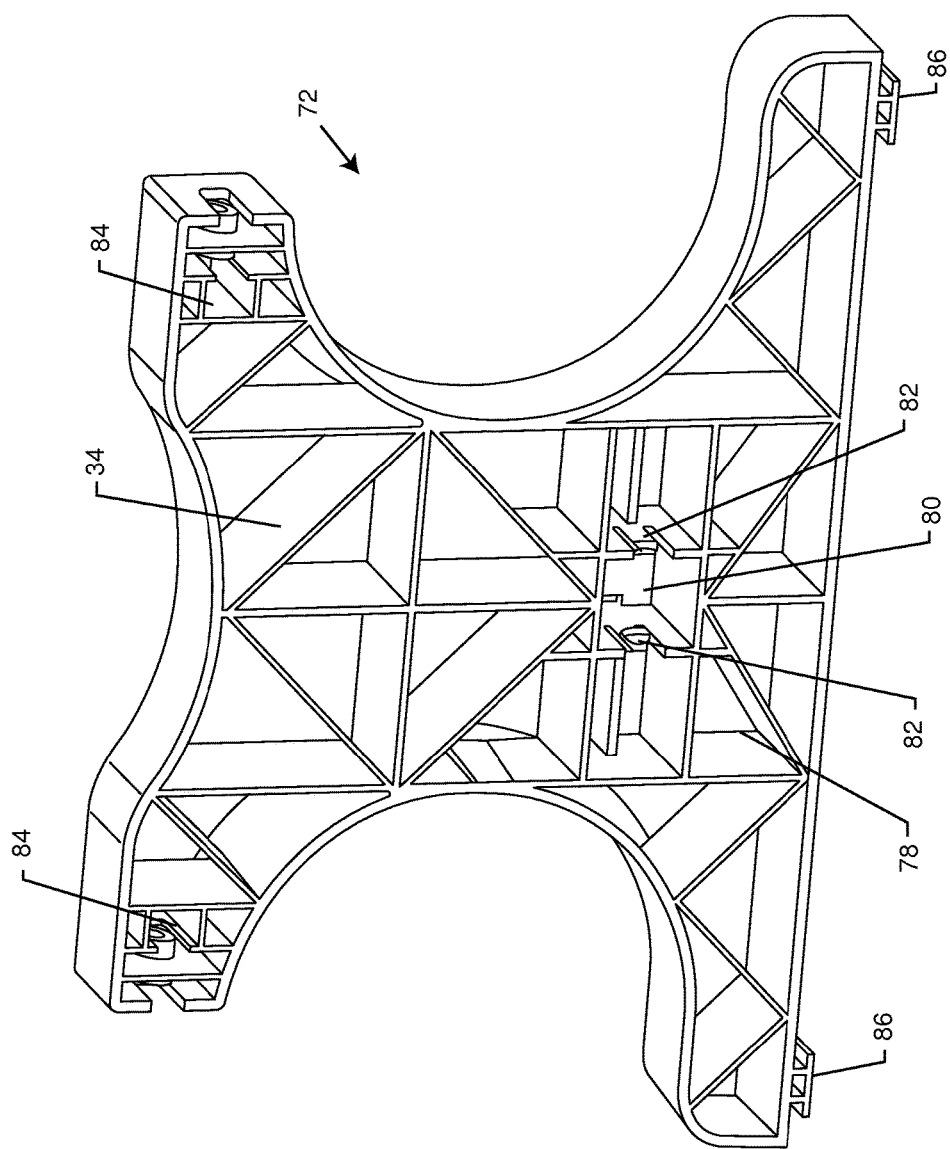
FIG. 12 is an inside perspective view of a roller support from the roller assembly base of FIG. 11.

As best shown in FIG. 12, when formed as the self-supporting rigid cylindrical treadwheel 40 the abutting ends of the plurality of platforms 12 may be staggered in relation to the abutting ends of the plurality of elongated curved connectors 44. In this way the abutting ends of the platforms 12 do not align with the abutting ends of the connectors 44. In this manner, the rigidity of the treadwheel structure 40 is aided by the inherent rigidity of the platform 12 part and connector 44 part.

Figure 1:
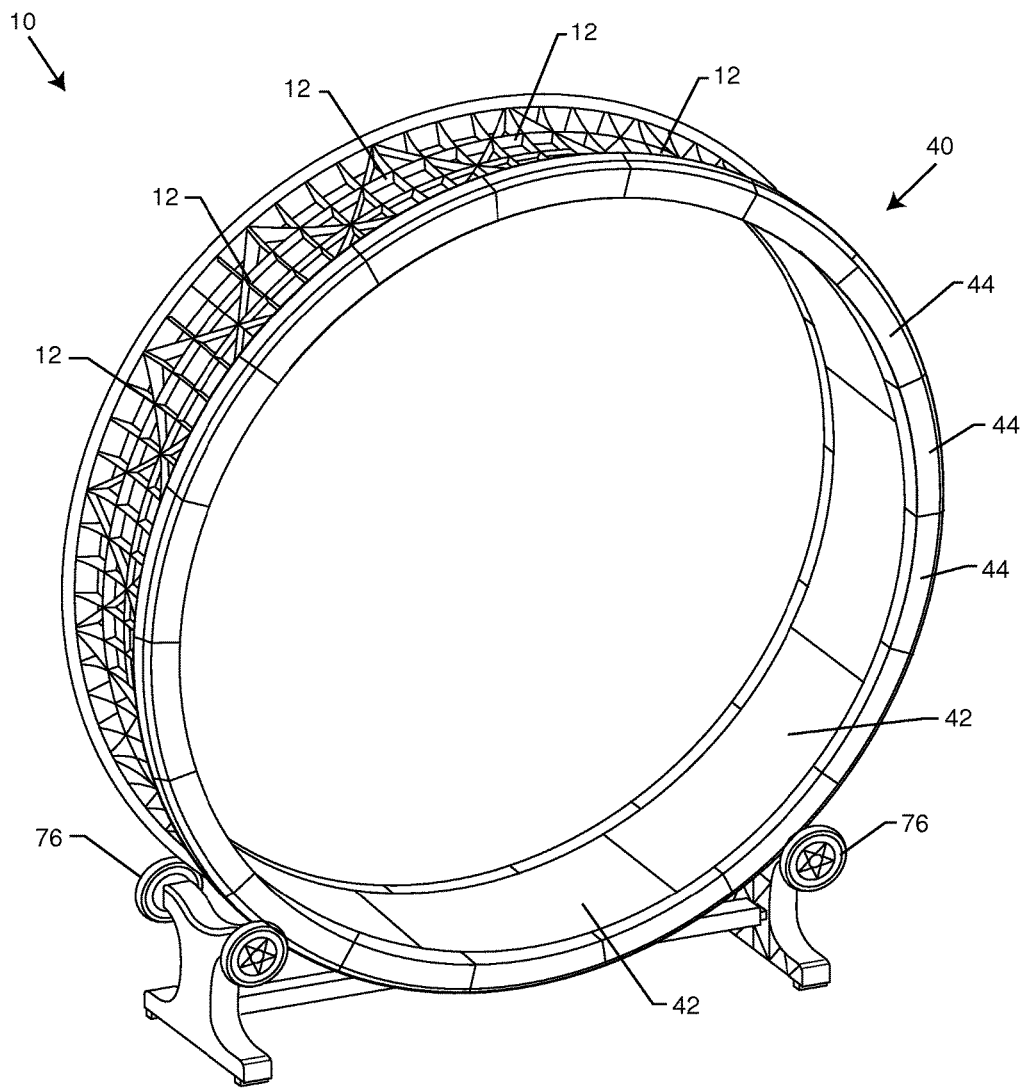
FIG. 1 is a perspective view of an exemplary embodiment of an animal treadwheel assembly.
Figure 11:
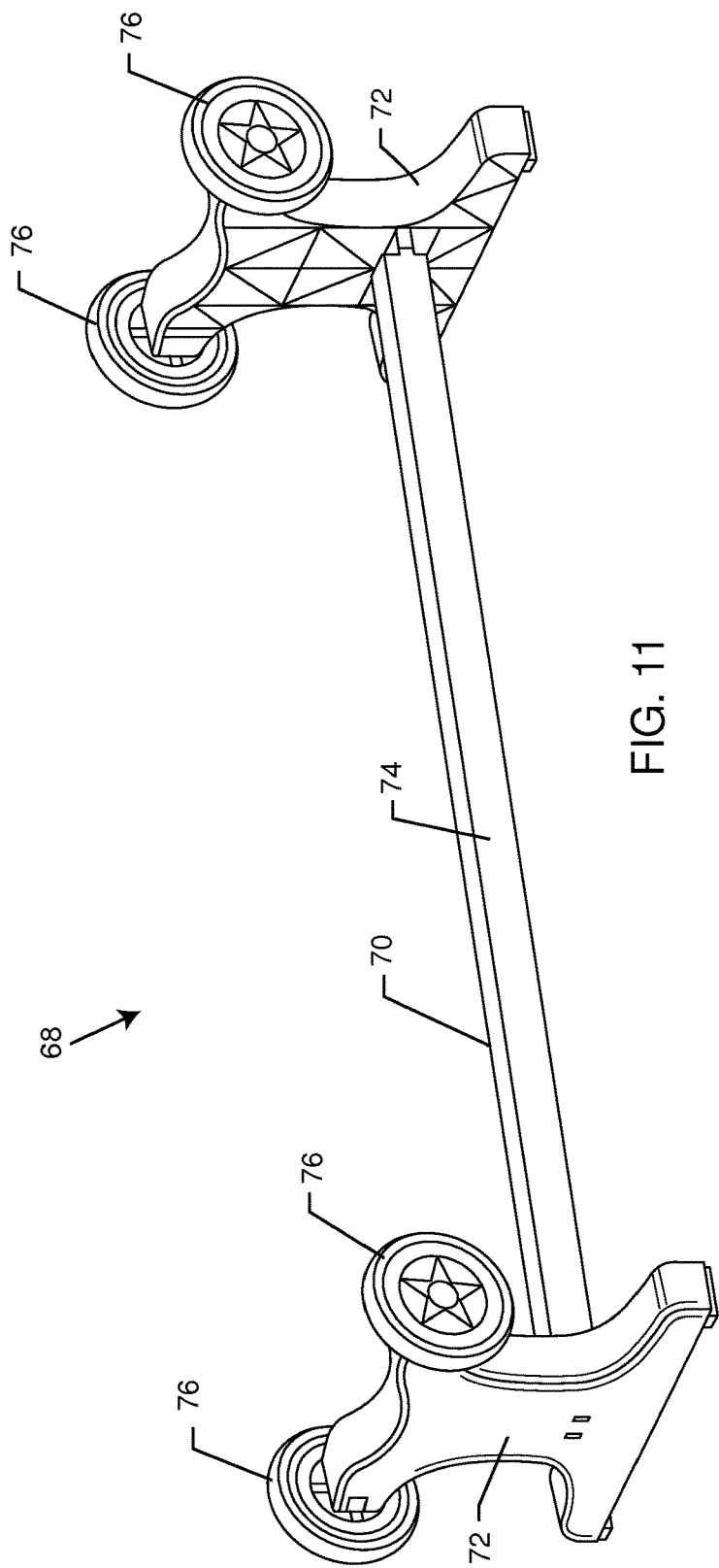
FIG. 11 is a perspective view of an exemplary roller assembly base from the structure of FIG. 1.
Figure 13:
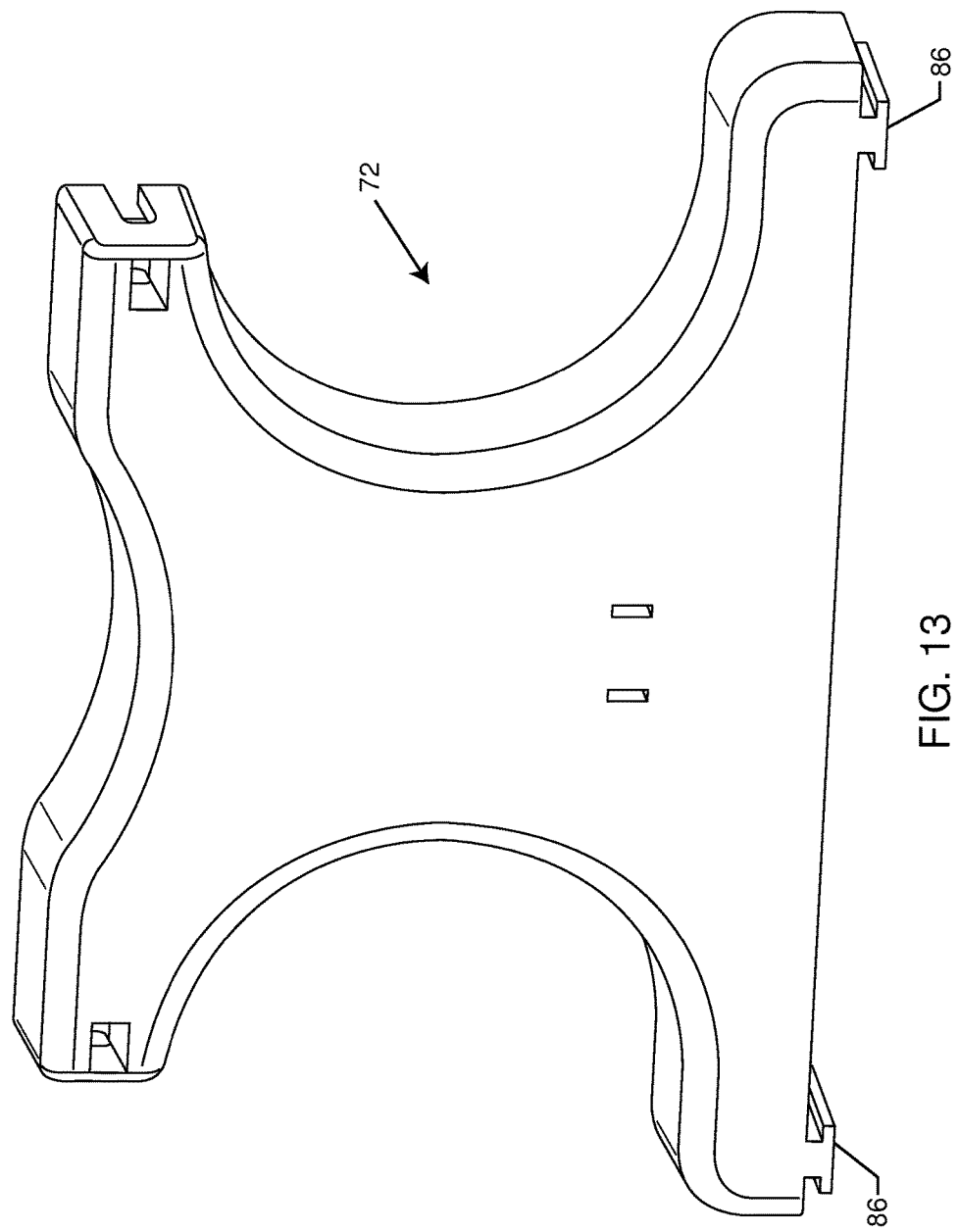
FIG. 13 is an outside perspective view of the roller support from FIG. 12.
Figure 14:
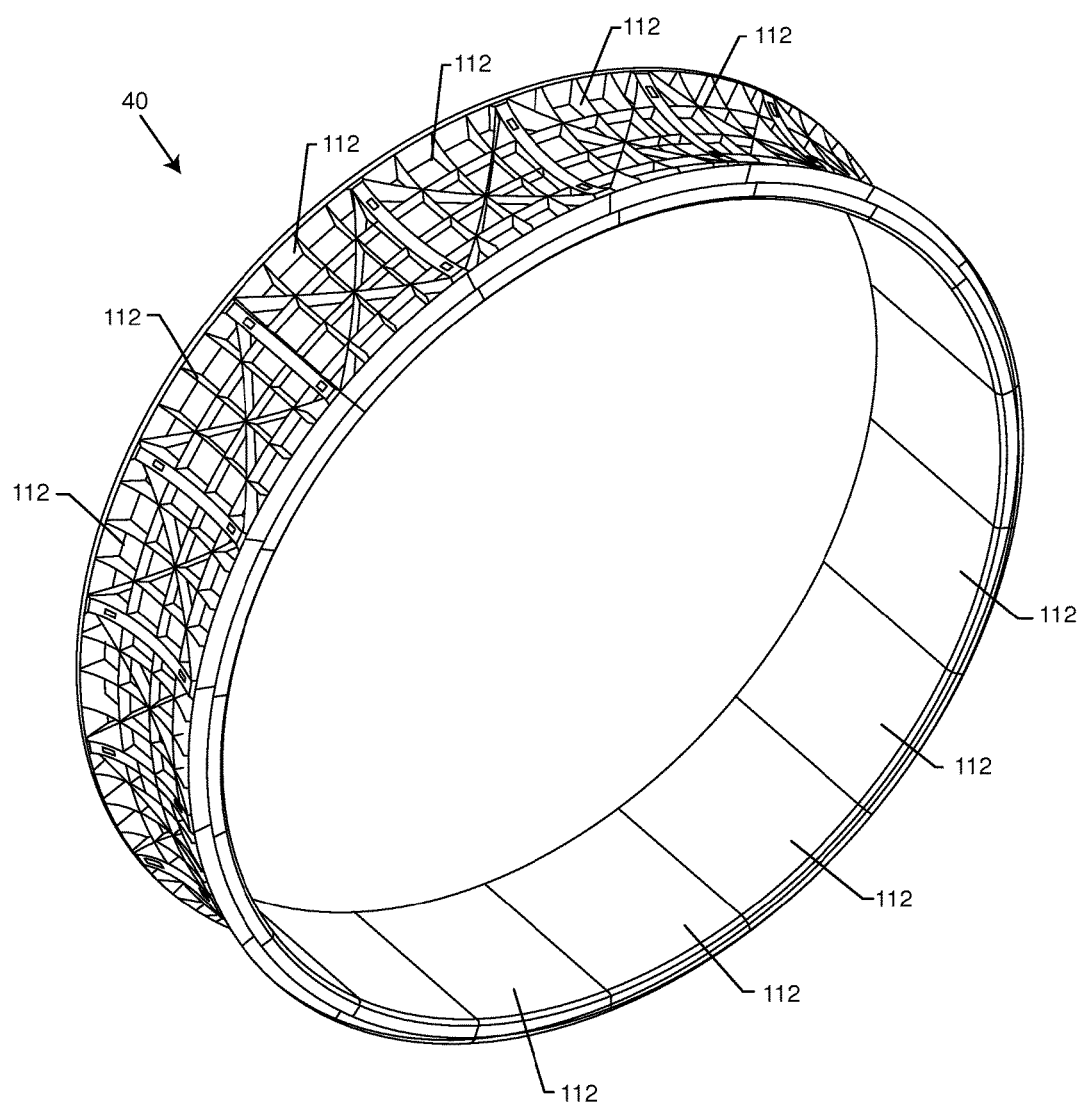
FIG. 14 is a perspective view of another exemplary embodiment of an animal treadwheel that only consists of platforms.
Figure 15:
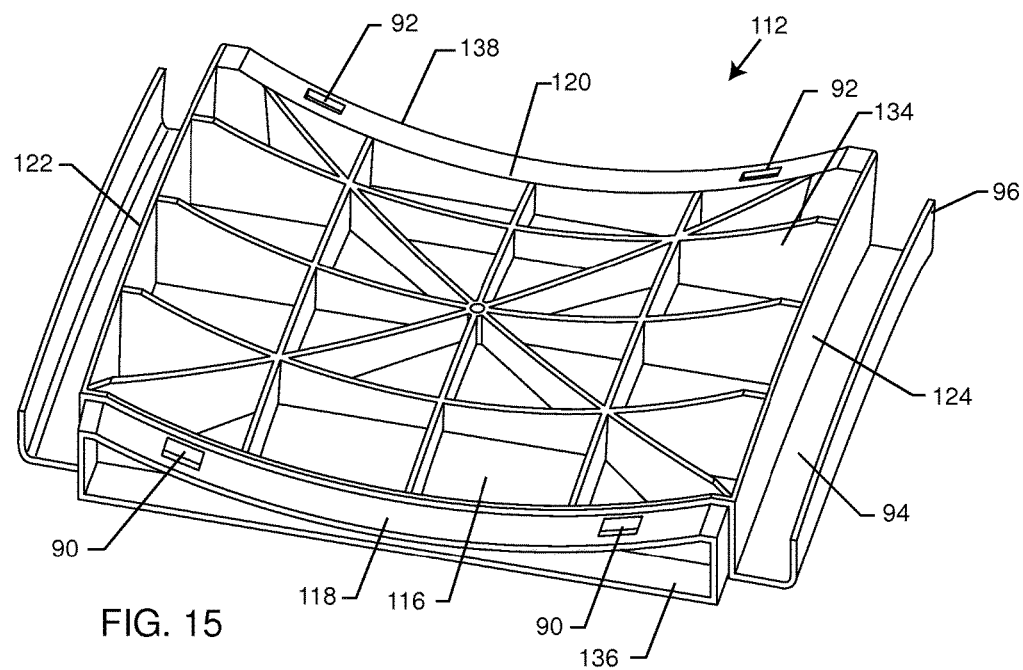
FIG. 15 is a bottom perspective view of the platform from FIG. 14.
Figure 16:
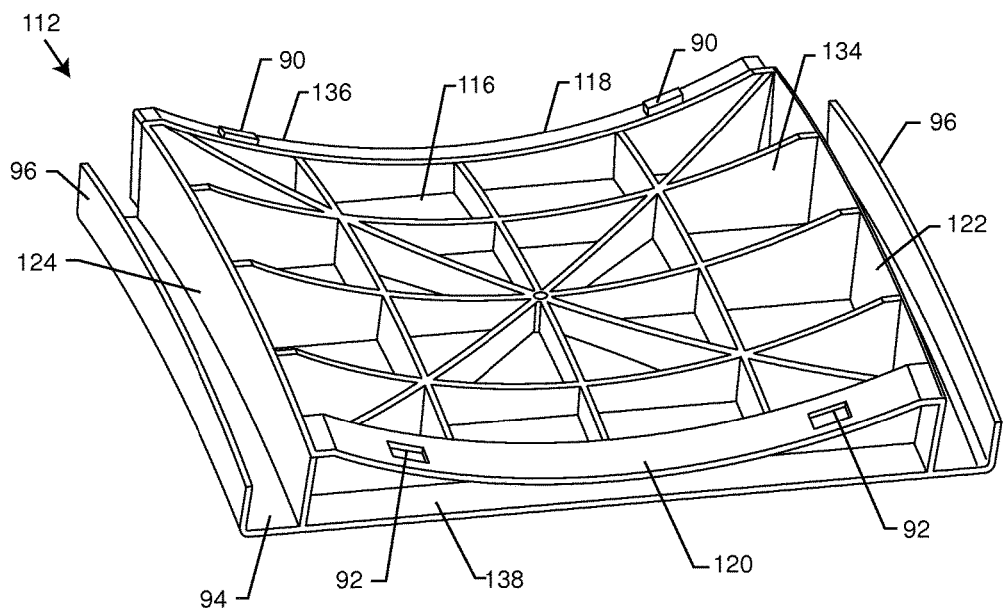
FIG. 16 is another bottom perspective view of the platform of FIG. 15.

Now referring to FIGS. 11-13, a roller assembly 68 is comprised of a stationary base 70 configured to rest upon a surface. The stationary base 70 is comprised of two roller supports 72 connected by an extension part 74. Each roller support 72 is configured to support two rollers 76, where the rollers 76 are configured to rotate freely such that the rollers 76 support the treadwheel structure 40 thereon as shown in FIG. 1.

Each roller support 72 can be made as an injection molded plastic part from a two part mold. On an inside 78 of the roller support 72 is an extension part receptacle 80. The extension part receptacle 80 is configured to accept an end of the extension part 74. The extension part receptacle 80 can include flexure tabs 84 that catch a hole or aperture formed in the ends of the extension part 74. The extension part 74 can be made as an extrusion, where the extrusion can have a cross-section that is square, rectangular, circular, oval or any other acceptable structural shape.

Each roller support 72 can also have nut capture features 84 molded therein. The nut capture feature 84 is used to secure/lock a nut from rotating once it is placed inside the nut capture feature 84. This is accomplished by sizing the inside of the nut capture feature 84 to be the same size as a particular nut. Then a roller 76 can easily be attached from the outside by taking a threaded fastener and going through a roller bearing of the roller 76 and fastening the fastener into the nut thereby securing the roller 76 to the roller support 72.

Each roller support 72 can also have a bottom extension 86 configured to receive and attach a rubber standoff or pedestal, such that the roller assembly 68 can rest upon a surface by using the rubber standoff or pedestal. In this way, increased grip can be achieved between the roller assembly 68 and the surface it is resting upon.

Each roller support 72 can also include a plurality of internal ribs 34 to give it increased stiffness and strength.

FIGS. 14-18 are of another embodiment of a treadwheel structure 40. Here, there are only platforms 112; eighteen platforms 112 to be exact. The platforms 112 connect to one another without the need for connectors 44. The platforms 112 still have the curved surface 114. The curved surface 114 is opposite the bottom side 116. Each platform 112 has a first end 118 opposite a second end 120, and a left side 122 opposite a right side 124.

In these embodiments, a platform extension 136 from one platform 112 is configured to lock into the platform recess 138 of an adjacent platform 112. Tabs 90 are configured to lock into apertures 92. Each platform 112 can also include strengthening ribs 134 to provide increased rigidity and strength.

Each platform 112 also has a roller surface 94 with a lip 96. The lip 96 can also be described as a raised edge. The roller surface 94 is similar in functioning to the curved bottom surface 52 of the connectors 44. The roller surface 94 allows the rollers 76 to roll upon thereby supporting the treadwheel structure 40 in a rotatably free manner. The lips 96 help to keep the treadwheel structure 40 on the rollers 76 the same way the lip 66 of the connector 44 did.

In the embodiment of FIGS. 14-18 the same platform 112 may be used to create a treadwheel structure 40 that doesn't use any auxiliary fasteners and can be assembled by hand quickly and efficiently.

A major advantage of the embodiments disclosed herein is that the structures can be packaged unassembled such that they encompass a much smaller volume than they would if the animal treadwheel assembly 10 was shipped assembled. In this manner significantly reduced shipping expenses can be gained while still providing an easy to assembly structure. Another advantage of the embodiments disclosed herein is that the treadwheel structure 40 can be assembled by a person without the need for tools or fasteners. The plurality of platforms 12 and connectors 44 can simply be pushed and snapped together through the inherent fastening means built into the platforms 12 and connector 44.

Although several embodiments have been described in detail for purposes of illustration, various modifications may be made to each without departing from the scope and spirit of the invention. Accordingly, the invention is not to be limited, except as by the appended claims.

What is claimed is:

1. An animal treadwheel assembly, comprising:
    a plurality of platforms, each platform comprising:
        a curved surface opposite a bottom side;
        a first end opposite a second end;
        a left side opposite a right side;
        wherein the first and second ends are connected by the left and right sides;
        wherein the curved surface is delimited by the first end, left side, second end, and right side;
        an upper right side edge formed along the right side concentric to the curved surface;
        a lower right side edge formed along the right side concentric to the upper right side edge;
        an upper left side edge formed along the left side concentric to the curved surface;
        a lower left side edge formed along the left side concentric to the upper left side edge;
    a plurality of elongated curved connectors manufactured as a separate part from the plurality of platforms, each connector comprising:
        an outside end opposite an inside end;
        a curved upper surface opposite a curved bottom surface;
        a first connector end opposite a second connector end;
        wherein the outside end is contiguous to the curved upper surface;
        wherein the curved upper surface is contiguous with the inside end;
        wherein the inside end is contiguous with the curved bottom surface;
        wherein the curved bottom surface is contiguous with the outside end;
        wherein the first connector end and second connector end are delimited by the outside end, curved upper surface, inside end and curved bottom surface;
        a first catch integrally formed as part of the elongated curved connector at the inside end near the curved upper surface;
        a second catch integrally formed as part of the elongated curved connector at the inside end near the curved bottom surface;
        a connector extension integrally formed as part of the elongated curved connector at the first connector end;
        a connector recess integrally formed as part of the elongated curved connector at the second connector end;
    wherein the first end of one platform is configured to be directly connectable to the second end of an adjacent platform in a repeatable manner where the plurality of platforms are configured to form a singular and continuous cylindrical surface from the plurality of curved surfaces, wherein when the plurality of platforms form the singular and continuous cylindrical surface each platform is prevented by its adjacent platform from translating in a direction that is perpendicular to the left side and right side;
    wherein the connector extension of one connector is configured to be directly connectable to the connector recess of an adjacent connector in a repeatable manner where the plurality of connectors are configured to form two singular and continuous rings;
    wherein each singular and continuous ring is directly attachable to the cylindrical and continuous cylindrical surface forming a self-supporting rigid cylindrical treadwheel, where the plurality of first catches connect to the plurality of upper side edges and where the plurality of second catches connect to the plurality of lower side edges; and
    a stationary base configured to rest upon a surface, the stationary base supporting a plurality of rollers, where the plurality of rollers are configured to roll against the plurality of curved bottom surfaces allowing the self-supporting rigid cylindrical treadwheel to spin freely when an animal moves upon the singular and continuous cylindrical surface.

2. The assembly of claim 1, including a lip edge projecting from and along the entirety of the curved bottom surface.

3. The assembly of claim 1, including a plurality of pads, each pad configured to attach to the entirety of the curved surface.

4. The assembly of claim 1, wherein the curved surface is concave.

5. The assembly of claim 1, wherein the self-supporting rigid cylindrical treadwheel is completely assembled only by a mating relationship between each elongated curved connector and each platform wherein the self-supporting rigid cylindrical treadwheel is void of any fasteners.

6. The assembly of claim 1, wherein each platform of the plurality of platforms consists of a single part of an injection molded plastic.

7. The assembly of claim 1, wherein each connector of the plurality of connectors consists of a single part of an injection molded plastic.

8. The assembly of claim 1, including a platform extension integrally formed at the first end of each of the plurality of platforms, and a platform recess integrally formed at the second end of each of the plurality of platforms, wherein the platform extension of the one platform is configured to be connectable to the platform recess of the adjacent platform in a repeatable manner for the plurality platforms without the use of a any fasteners.

9. The assembly of claim 8, wherein the platform extension is configured to assemble and attach into the platform recess in a movement direction that is generally perpendicular to adjacent first and second ends, and wherein each platform extension fits within its respective adjacent platform recess preventing the plurality of platforms from translating with respect to each adjacent platform in the direction that is perpendicular to the left side and right side.

10. The assembly of claim 1, wherein the connector extension is configured to assemble and attach into the connector recess in a movement direction that is generally perpendicular to the outside and inside ends.

11. The assembly of claim 1, wherein each singular and continuous ring is configured to assemble and attach to the plurality of platforms in a movement direction that is perpendicular to the left side and right side of the platforms.

12. The assembly of claim 1, wherein when formed as the self-supporting rigid cylindrical treadwheel the abutting ends of the plurality of platforms are staggered in relation to the abutting ends of the plurality of elongated curved connectors.

13. The assembly of claim 1, wherein the plurality of platforms comprise at least four platforms.

14. The assembly of claim 1, wherein the plurality of elongated curved connectors comprise at least sixteen connectors.

15. An animal treadwheel assembly, comprising:
a plurality of identically-shaped platforms, each platform comprising a curved surface delimited by a first end, left side, second end and right side, where the left side is opposite the right side and the first end is opposite the second end;
a plurality of identically-shaped elongated curved connectors manufactured as a separate part from the plurality of identically-shaped platforms, each connector comprising:
a first connector end opposite a second connector end;
where the connector ends are delimited by a curved upper surface, an outside end, a curved bottom surface and an inside end, where the outside end is opposite the inside end and where the curved upper surface is opposite the curved bottom surface;
a connector extension integrally formed as part of the elongated curved connector at the first connector end;
a connector recess integrally formed as part of the elongated curved connector at the second connector end;
wherein the first end of one platform is configured to be directly connectable to a second end of an adjacent platform in a repeatable manner where the plurality of platforms are configured to form a singular and continuous cylindrical structure, wherein when the plurality of platforms form the singular and continuous cylindrical surface each platform is prevented by its adjacent platform from translating in a direction that is perpendicular to the left side and right side;
wherein the connector extension of one connector is configured to be directly connectable to a connector recess of an adjacent connector in a repeatable manner where the plurality of connectors are configured to form a first singular and continuous ring and a second singular and continuous ring, wherein the connector extension is configured to assemble and attach into the connector recess in a movement direction that is generally perpendicular to the outside and inside ends;
wherein the first ring is configured to be directly attached to the right side of the cylindrical structure and the second ring is configured to be directly attached to the left side of the cylindrical structure forming a self-supporting rigid cylindrical treadwheel, wherein the self-supporting rigid cylindrical treadwheel is completely assembled only by a mating relationship between each elongated curved connector and each platform wherein the self-supporting rigid cylindrical treadwheel is void of any fasteners; and
a stationary base configured to rest upon a surface, the stationary base supporting a plurality of rollers, where the plurality of rollers are configured to roll against the plurality of curved bottom surfaces allowing the self-supporting rigid cylindrical treadwheel to spin freely when an animal moves within the treadwheel.

16. The assembly of claim 15, wherein the self-supporting rigid cylindrical treadwheel can be assembled by a person's hands without the need for tools.

17. The assembly of claim 15, wherein each platform of the plurality of platforms and each connector of the plurality of connectors consists of a single part of an injection molded plastic.

18. A self-supporting rigid cylindrical animal treadwheel, consisting of:
a plurality of identically-shaped platforms each having a curved surface, wherein a first end of one platform is configured to be connectable to a second end of an adjacent platform in a repeatable manner where the plurality of platforms are configured to form a singular and continuous cylindrical structure;
a plurality of identically-shaped elongated curved connectors manufactured as a separate part from the plurality of identically-shaped platforms, wherein a connector extension of one connector is configured to be directly connectable to a connector recess of an adjacent connector in a repeatable manner where the plurality of connectors are configured to form a first singular and continuous ring and a second singular and continuous ring, wherein the connector extension and connector recess are integrally formed as part of each of the elongated curved connectors;

wherein the first ring is configured to be directly attached to a right side of the cylindrical structure and the second ring is configured to be directly attached to a left side of the cylindrical structure; and wherein the self-supporting rigid cylindrical animal treadwheel is void of any fasteners when assembled; wherein the self-supporting rigid cylindrical animal treadwheel is configured to have an animal positioned on the curved surface to cause the self-supporting rigid cylindrical animal treadwheel to rotate for exercise.

19. The treadwheel of claim 18, wherein the self-supporting rigid
cylindrical animal treadwheel doesn't require tools during assembly.

20. The treadwheel of claim 18, wherein each platform of the plurality of platforms and each connector of the plurality of connectors consists of a single part of an injection molded plastic.

21. The treadwheel of claim 18, wherein when the plurality of platforms form the singular and continuous cylindrical surface each platform is prevented by its adjacent platform from translating along their shared first and second ends.

* * * * *